(12) United States Patent
Brancato

(10) Patent No.: US 11,439,915 B2
(45) Date of Patent: Sep. 13, 2022

(54) SYSTEMS AND METHODS FOR MAKING REAL-TIME, FANTASY SPORTS COACHING ADJUSTMENTS TO LIVE GAMES

(71) Applicant: Gerard Joseph Brancato, Santa Monica, CA (US)

(72) Inventor: Gerard Joseph Brancato, Santa Monica, CA (US)

( * ) Notice: Subject to any disclaimer, the term of this patent is extended or adjusted under 35 U.S.C. 154(b) by 0 days.

(21) Appl. No.: 16/504,218

(22) Filed: Jul. 5, 2019

(65) Prior Publication Data

US 2020/0009463 A1    Jan. 9, 2020

Related U.S. Application Data

(60) Provisional application No. 62/758,124, filed on Nov. 9, 2018, provisional application No. 62/735,854, filed on (Continued)

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/828* | (2014.01) |
| *A63F 13/65* | (2014.01) |
| *G06F 9/451* | (2018.01) |
| *G06F 16/2458* | (2019.01) |
| *G06F 16/955* | (2019.01) |
| *G06F 3/04847* | (2022.01) |
| *G07F 17/32* | (2006.01) |
| *G06F 3/0482* | (2013.01) |

(52) U.S. Cl.
CPC ............ *A63F 13/828* (2014.09); *A63F 13/65* (2014.09); *G06F 9/451* (2018.02); *G06F 16/2462* (2019.01); *G06F 16/955* (2019.01); *A63F 2300/558* (2013.01); *A63F 2300/69* (2013.01); *A63F 2300/8052* (2013.01); *G06F 3/0482* (2013.01); *G06F 3/04847* (2013.01); *G07F 17/3244* (2013.01)

(58) Field of Classification Search
USPC ........................ 463/1, 20, 22, 25, 39, 40, 42
See application file for complete search history.

(56) References Cited

U.S. PATENT DOCUMENTS

| | | | |
|---|---|---|---|
| 2007/0060325 A1* | 3/2007 | Gradek | ................. A63F 13/352 463/29 |
| 2013/0167162 A1* | 6/2013 | Fernandez | ............ G06F 16/958 719/328 |
| 2016/0263483 A1* | 9/2016 | Le | ........................... A63F 13/65 |

* cited by examiner

*Primary Examiner* — Adetokunbo O Torimiro
(74) *Attorney, Agent, or Firm* — K&L Gates LLP

(57) ABSTRACT

A fantasy sports system includes a user device, a database, and a controller. The database includes a plurality of statistical adjustments, with each statistical adjustment modifying a score generated during a live contest. The score is generated during a live contest and is related to a team statistic. The controller is configured to provide a first statistical adjustments graphical user interface accessible through the user device through which a first user is presented with a first set of statistical adjustments of the plurality of statistical adjustments, and receive a selection of one of the first set of statistical adjustments from the first user. The controller then calculates a fantasy score using the data related to the live contest and the first selected statistical adjustment. The data includes an actual total score of the live contest, the score related to the team statistics, and the team statistics.

20 Claims, 10 Drawing Sheets

Related U.S. Application Data on Sep. 24, 2018, provisional application No. 62/694,828, filed on Jul. 6, 2018.

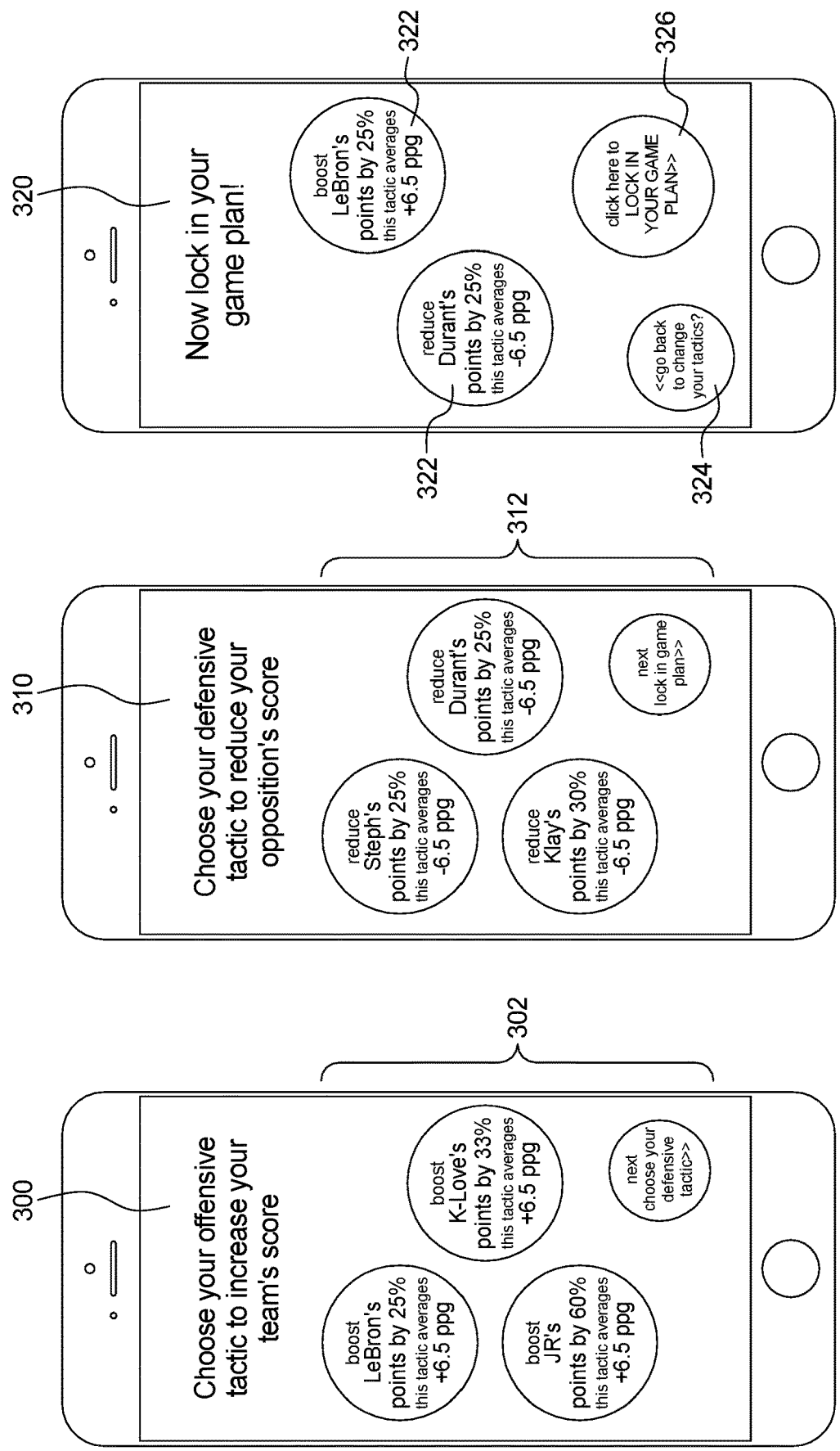

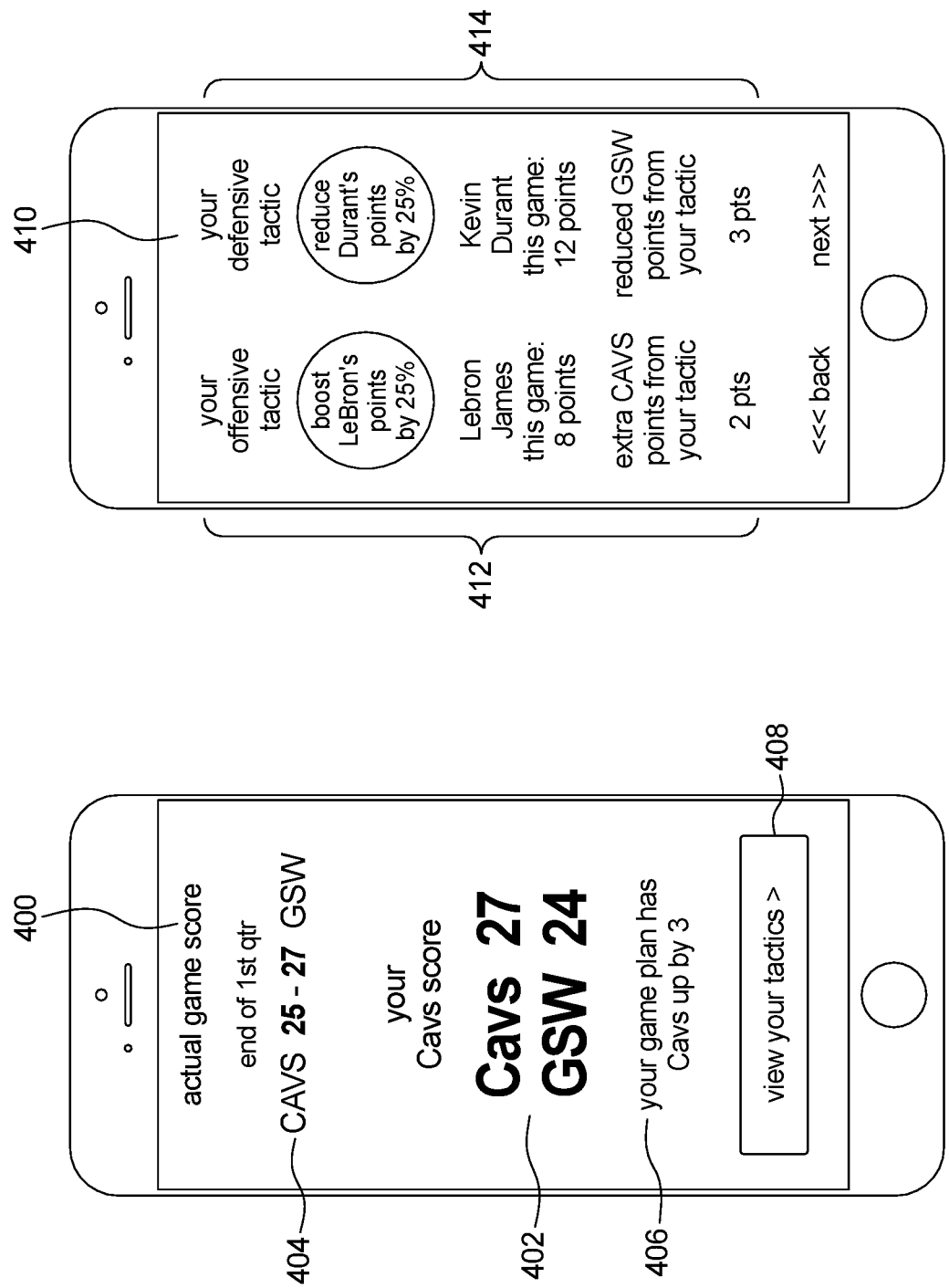

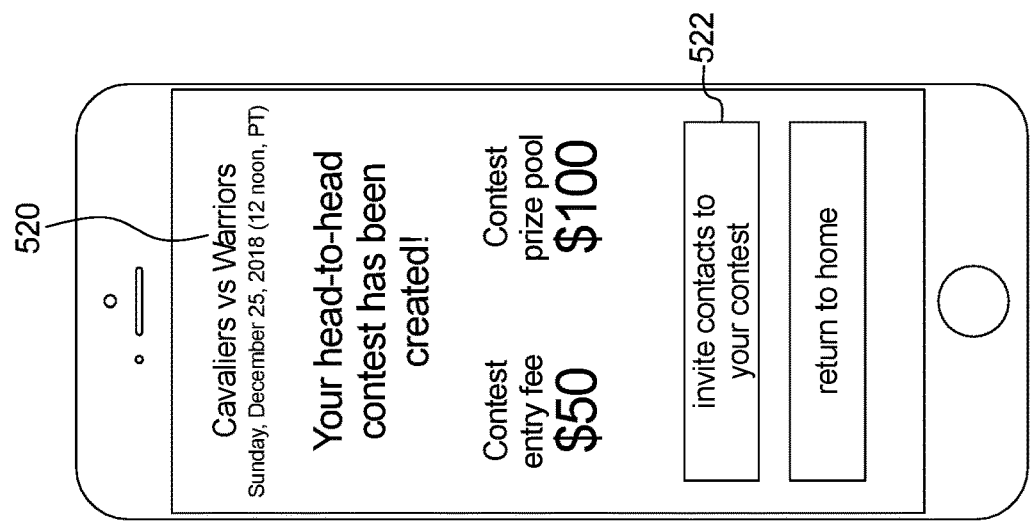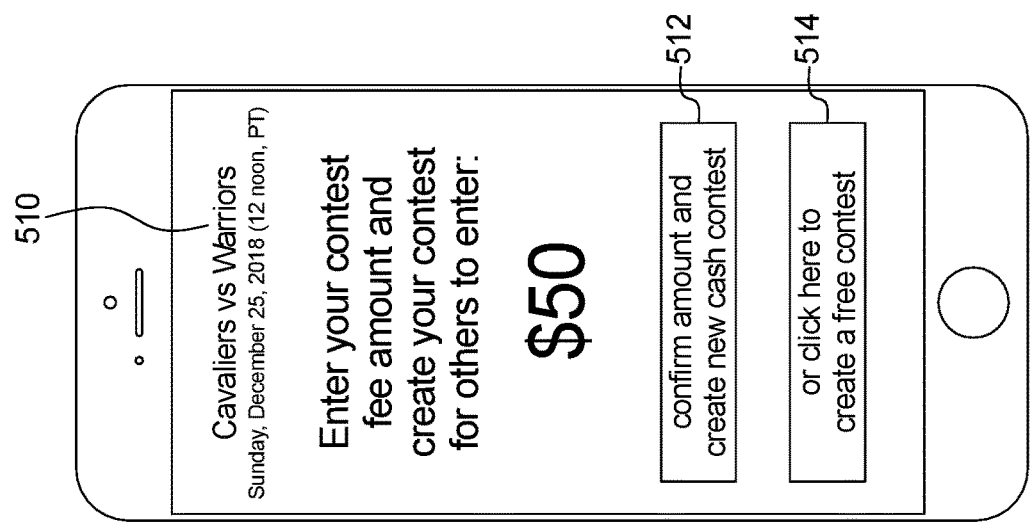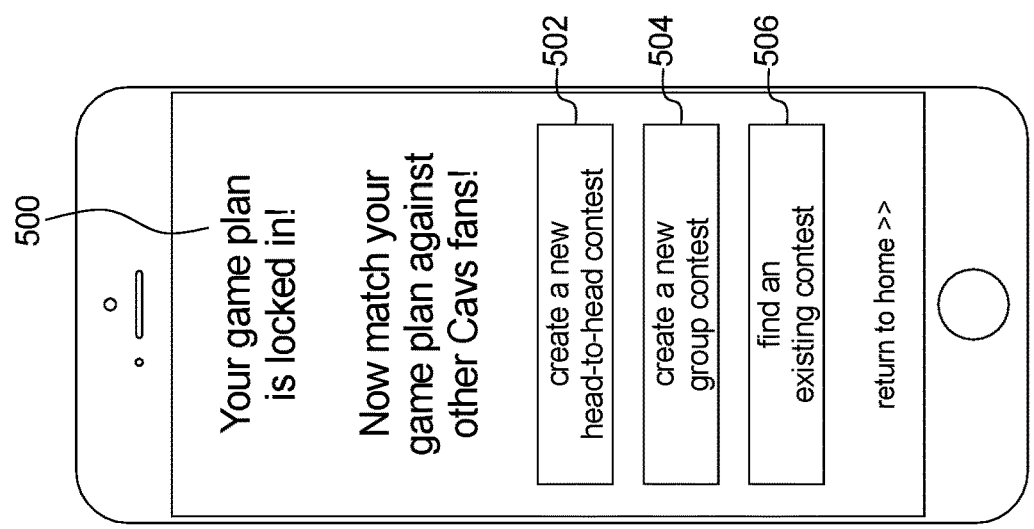

SYSTEMS AND METHODS FOR MAKING REAL-TIME, FANTASY SPORTS COACHING ADJUSTMENTS TO LIVE GAMES

CROSS-REFERENCE TO RELATED APPLICATIONS

This application incorporates by reference and claims the benefit of priority to U.S. Provisional Application No. 62/758,124, filed on Nov. 9, 2018, U.S. Provisional Application No. 62/753,854, filed on Sep. 24, 2018, and U.S. Provisional Application No. 62/694,828, filed on Jul. 6, 2018, each of which are incorporated herein by reference.

BACKGROUND OF THE INVENTION

The present subject matter relates generally to a system and method for a fantasy sports platform for playing fantasy sports as a fantasy coach of a singular, real-life team, in contrast to the traditional fantasy sports participation as a general manager or team owner of a fantasy team typically employing a draft system and comprising players from multiple teams. Generally, the present invention offers a fantasy sports user the opportunity to play as their favorite or fair-weather team for a singular, real-life contest and select specific coaching-style tactics that, when applied to their chosen team's game, result in an improved score as compared to the team's actual score for the game. The present invention relates to a fantasy sports system with components configured to allow users to make coaching decisions that increase or decrease their selected teams or their selected teams' opponent scores (typically "offensive" and "defensive" coaching decisions, in nature, respectively) that affect the outcome of a sports game and engineer fantasy win or loss margins in real-time.

Fantasy sports platforms have enjoyed widespread popularity. These platforms promise to create an experience for sports fans that elevates their entertainment from that of fandom to fantasy. The success of that promise is clear. Despite this success, however, there has not been much development in these fantasy platforms themselves. Currently, using fantasy basketball as an example, there is one type of model used to structure systems and methods of fantasy sports platforms: the draft model.

Typically, fantasy sports platforms place users in the same single role as team managers or owners in charge of a fictitious team's draft. In other words, a user selects players from different teams throughout a given league (such as, but not limited to, the NBA, MLB, NFL, NHL, or eSports or virtual sports leagues for example) to form their fantasy teams. Once a team is "drafted," the manager may then decide to make decisions as to which players on the fantasy team's roster may play during a given game time. These pre-game choices are limited, however, to substitutions for who will be "playing" during a given game time, e.g. when a rostered player gets an injury. A fantasy game will pit two fantasy teams against one another, with scores being calculated based on how each team's drafted players perform in their separate real life games. The user whose team accumulates the most fantasy points wins.

Despite its success, this draft model has limitations and problems. As use of the draft model has continued, it has developed into a separate form of entertainment based on the niche strategic gameplay and advanced statistical knowledge involved in drafting and managing professional sports teams. The consequence of this narrowed development is that fantasy sports become more of a chore rather than a fantasy for the everyday fan. Three key issues with the draft model are (1) spreading user attention across multiple games, (2) requiring advanced statistical knowledge for success, and (3) the failure to provide fans with a way to maintain a strong connection with their favorite teams.

First, the viewing habits of fans do not match up with the structure of current fantasy sports platforms. Whereas fantasy teams are affected by results in multiple games occurring across a league, many fans typically only watch their favorite team play. In other words, fantasy leagues pull fan attention away from the games they actually care about rather than providing more access and involvement. Essentially, fantasy sports users must choose between enjoying a connection with their favorite team or their fantasy team. As an example, a dedicated fan of the LA Lakers may play in a draft-model fantasy league against an opposing user whose roster includes some of the Lakers players. The dedicated fan is conflicted about cheering for his favorite team when his own fantasy team would suffer as a result of the Lakers' success. In this circumstance, the draft model fantasy contest runs counter to the typical sports fan experience. Further, as draft-model fantasy contests are increasingly dominated by more sophisticated players, the requirement that users have advanced statistical knowledge to succeed in the draft model is discouraging to everyday fans who do not have the time, money, or resources typically needed to play at such a high level.

Accordingly, there is a need for a system and method for a fantasy sports system as described herein that allows users to participate more fully in the real-time game play of their team of choice through pre-game and/or real-time coaching decisions while giving these users access to statistics and statistical models to help inform their decisions and keep the playing field level when competing against other users.

BRIEF SUMMARY OF THE INVENTION

To meet the needs described above and others, the present disclosure provides a system and method for a fantasy sports system that allows users to participate more fully in the real-time game play of their team of choice through pre-game and/or real-time coaching decisions. Users make these coaching decisions by applying a select set of optimized statistical modifiers, referred to as "coaching tactics," to real-time events occurring in a live sports game in order to generate a corresponding fantasy game outcome.

In one example embodiment, the system initially generates a statistical improvement to the team's overall result, that when applied to that team's games, modifies that team's win-loss record, often to, or near, the best in its professional league's history or potentially beyond. This statistical improvement is referred to as the "game modifier," which is the number of points that, when added to a team's score and subtracted from opponent's score, better ensure a fantasy score victory and improve a team's win-loss record when applied to its games throughout the season. In this example, the system then develops optimized statistical modifiers, referred to more generally as the coaching tactics, that are related to specific player and team statistics and, when applied to the live contest, result in a fantasy score that is an improvement over the actual score, as described in greater detail below. The application of the coaching tactics ideally, if selected successfully, cause the fantasy statistics, which are based on real life game statistics, to improve by an amount near, or beyond, the amount of the game modifier.

Where the game modifier is the overall improvement that transforms a team's real-life game results into a highly improved fantasy result, the coaching tactics are the means the system offers to a user to improve their team's score by an amount, near, or above, the game modifier. Coaching tactics modify specific statistics within the game, such as points scored by a particular player, or points scored by a team in a particular way. The tactics work to recalculate specific statistics for the user's chosen team in such a way as to improve them, and recalculate specific statistics of the user's chosen team's opposition in such a way as to reduce the benefit or impact of them. In doing so, the coaching tactics work to generate an improved score for the user's chosen team's game or contest. Coaching tactics improve the user's chosen team's score as well as reduce the opponent's score, improving the user's chosen team's winning margin (or reducing its losing margin) or turning their chosen team's loss into a win by way of the system's fantasy scoring method.

During and after the live game, the system applies the statistical modifications of the coaching tactics to their corresponding real life game or match statistics, to determine which coaching tactics are more effective for that given game or match. It also calculates all combinations of the coaching tactics to the actual results of the game in order to compare and rank the impact of each tactic and combination of tactics on the game's outcome. The system also continuously collects and optimizes the statistical modifiers throughout the season to account for changes in team and individual player records and performance in order to maintain competitive parity across a given sports league and its corresponding fantasy contests.

By providing a select number of options of statistical modifiers to the user in the form of coaching tactics, and continually optimizing the modifiers throughout the season based on each team's record and performance, the system and method provide a fantasy sports league and contest platform that allows users to experiment with and employ different modifiers and their combinations on team statistics throughout a given sports season. The system allows users to play as a fantasy coach for a chosen team's live game as well as to compete against other fantasy coaches for the most successful game plan strategies using a discrete number of offensive and defensive tactics based on team, league, and player records and statistics collected throughout the current and previous seasons of a given professional sports league.

This system and method is not limited to any particular sport. As such, it may be applied to any sport by creating optimized statistical modifiers (the system's game modifiers and coaching tactics) relative to a given sport's point scoring system and league, team, and player performance statistics. The system and method described herein may be applied to professional and virtual (e.g. eSports) leagues for sports such as basketball, baseball, American football, cricket, Australian rules football, soccer, and more.

The system includes a server that receives sports data and communicates with a downloadable software application on a user's device. To use the fantasy gameplay system and method, users select a specific team, which could be a user's favorite or fair weather team. In the example embodiment described herein, the user then selects from that chosen team's game schedule to determine which specific game the user would like to coach. The system provides coaching tactic options including both offensive and defensive tactics, which generally relate to parameters that boost or increase a user's team's points, goals, runs, or score and/or decrease the opposing team's points, goals, runs, or score. For example, the user may select to increase the number of points earned by a specific player on his team by a predefined percentage, or the user may choose to reduce the number of points earned by a specific player on the opposing team by a predefined percentage. Once the user has made their pre-game selection of these coaching tactics and locks in the game plan, the system presents the score of the game plan in real time. In another embodiment, the user selects coaching tactics throughout their chosen team's live game.

The offensive and defensive coaching tactics are calculated based on the relevant professional sports league data to create league-wide parity between the professional teams. As the season progresses, the system adjusts team modifiers and coaching tactics to account for changes in team record and player performance.

Once the user has selected his/her coaching tactics and the game has started, the system monitors the live game statistics and applies the coaching tactics to the results of the game in real-time, providing notifications to the user regarding these effects so he/she can see the impact of his/her coaching decisions on the outcome of the game in real-time. Once the game is over, the system applies all combinations of the offered coaching tactics to the actual results of the selected game in order to rank each tactic and each combination of tactics. The server collects user performance data related to the success of their tactical choices in improving team scores, comparing and ranking those results and records against those of other users also using the system to fantasy coach a given team. Accordingly, the user has a sense of how successful their coaching strategy was in relation to those of other users. The user may, through this system, publish statistics, game outcomes, and/or ranking and performance using the system to various social media and other sites. Furthermore, in order to make more informed decisions about strategy, a user may access relevant analytics through this system and method, which are collected and analyzed through its server. These statistics may reflect, for example, the success rate of a given tactic. A user may use this data to make more informed decisions about which tactic to use against a given team, especially if the user is competing against others, in head-to-head or group fantasy contests.

In one embodiment, the system calculates a unique "game modifier" for each team, an overall statistical improvement that, when applied to the scores of each game, would improve their results for each game and their overall win-loss record over the course of a season. In some cases, the application of the game modifier may improve the win-loss record to the best win-loss record in a sports league's history. The following description of the present invention uses NBA basketball and the 2017-2018 Cleveland Cavaliers as an example, during which the Cleveland Cavaliers won 50 of 82 regular season games. If 9 points were added to the Cavaliers points scored for each of their games and 9 points were deducted from their opponent's points scored each game, the Cavaliers would have won 73 of the 82 games that season, equal to the best regular season win-loss record in NBA history (at this time). In this case, 9 points is the game modifier.

Coaching tactics are typically presented in context with a user's chosen sport (basketball in this example). For example, where the system is being used to play fantasy basketball, the coaching tactics offered to improve specific statistics for the user's chosen team are presented to the user as "offensive tactics" and the coaching tactics offered that decrease or reduce the benefit or impact of specific statistics for the user's team's opposition are presented to the user as "defensive tactics". Where the system is being used to play fantasy cricket, by comparison, these coaching tactics would be presented as "batting tactics" and "fielding and bowling tactics", and so forth for other sports.

The object of the system's game is for the user to select which coaching tactic(s) and combinations (known as the "game plan") will produce the greatest statistical improvement and, thus, fantasy score for their chosen team's game or contest based on the real-life statistics for that same game. An additional challenge is presented to the user if they choose to compete against other users employing their own game plans.

In competition with other users, the objective of the system is for a user to select a coaching tactic(s) that produce a greater statistical improvement than coaching tactic(s) selected by other users, playing as the same team for that same game or sporting contest. The user with the best fantasy game margin for their chosen team's real life game or match (which could be the highest winning margin or lowest losing margin) is the winner of the contest between users.

The system and method translates to other sports and leagues, such as the National Football League, Major League Baseball and one-day cricket. For example, the 2016-2017 Oakland Raiders had a 6-10 win-loss record. If eleven points were added to each of their games scores that season, and eleven points were deducted from their opponent's total in each game, the Raiders win-loss record for that season would have been 15-1. Therefore, a game modifier of eleven points would have given the Raiders a vastly improved NFL regular season record. The system would offer a user playing as a fantasy coach for the Oakland Raiders a series of offensive tactics that potentially increase a particular Raiders' offensive statistic by eleven points and also offer a series of defensive tactics that potentially decrease a particular offensive statistic of the opposition's by eleven points.

In another example, Major League Baseball's 2016-2017 LA Dodgers had a 104-58 win-loss record. If one run was added to each of their game scores, and one run was deducted from each opponent's total, the Dodgers win-loss record for that year would have been 123-39. Therefore, a game modifier of one run would have given the Dodgers a vastly improved MLB regular season record. The system would offer a user playing as a fantasy coach for the Dodgers a series of batting tactics that potentially increase a particular Dodgers batting statistics by one run and also offer a series of fielding and pitching tactics that potentially decrease a particular batting statistic of the opposition's by one run.

In another example, Australia lost a 2017-2018 one-day international game against England by sixteen runs, 286 to 302. If 9 runs were added to Australia's runs total and 9 runs were deducted from England's total, Australia would have won the match. Therefore, a game modifier of 9 runs would have given Australia victory. The system would offer a user playing as a one-day fantasy coach for Australia a series of batting tactics that potentially increase a particular Australian batting statistic by 9 runs and also offer a series of fielding and bowling tactics that potentially decrease a particular batting statistic of the opposition by 9 runs.

By providing a designated server that includes the ability to collect, store, and analyze both professional sports and fantasy player statistics, the system and method allows users access to up-to-date, real-time team information and unique sets of optimized statistical modifiers to apply as coaching decisions to create and/or affect the fantasy outcomes of live sports games, as well as other user data to compare use of these statistical modifiers, their combinations, and their impact on a team's statistics. Furthermore, the server includes the ability to send notifications to user devices, allowing them to stay up-to-date on their network activity, chosen games/teams, the success of their choice of coaching tactics, competitions, and ranking and performance among other users.

By providing a connection to a network of users through the internet and connectivity with the system's server and the user's device, the system and method provides users a means of communicating and connecting with other users. This connectivity facilitates various competitions between users based on the relative success of their chosen coaching tactics and their combination. Furthermore, this connectivity further facilitates these competitions through the messaging, and publication of results and statistics through this system as well as other existing social media networks in which the user may participate.

An object of the invention is to provide a solution to fantasy players interested in participating in games from a coaching perspective.

In some embodiments, the user has the option of creating and challenging other users to competitions, pitting their game plans and coaching tactics against each other, which could have stakes and buy-ins.

Another object of the invention is to provide a solution to the distance that fantasy players have from their teams of choice.

Another object of the invention is to level the playing field between fantasy players by providing players access to statistics and statistical models through the fantasy network that will better inform players about potential decisions.

Another advantage of the invention is that it provides a means for fantasy players to engage in pre-game and/or real-time decision making to affect the fantasy results of a game that they are watching live.

Another advantage of the invention is that it provides precisely calculated coaching options, other than simply, for example, choosing players or betting against a points spread.

Yet another advantage of the invention is that it provides a means of accumulating and distributing game points or credits based on a user's success over the course of a given sports league's season.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Illustrating the concept using the sport of basketball and the National Basketball Association teams and players as an example, the drawing figures depict one or more implemen tations in accord with the present concepts, by way of example only, not by way of limitations. In the figures, like reference numerals refer to the same or similar elements.

FIGS. 3A, 3B, and 3C include an offensive tactic selection user interface, a defensive tactic selection user interface, and a game plan lock-in user interface of the system of FIG. 1.

FIGS. 4A and 4B include a game score user interface and a game plan update user interface of the system of FIG. 1.

FIGS. 5A-5E include contest creation user interfaces, a contest selection (or contest board) user interface, and a contest accept-or-reject interface of the system of FIG. 1.

DETAILED DESCRIPTION OF THE INVENTION

Figure 1:
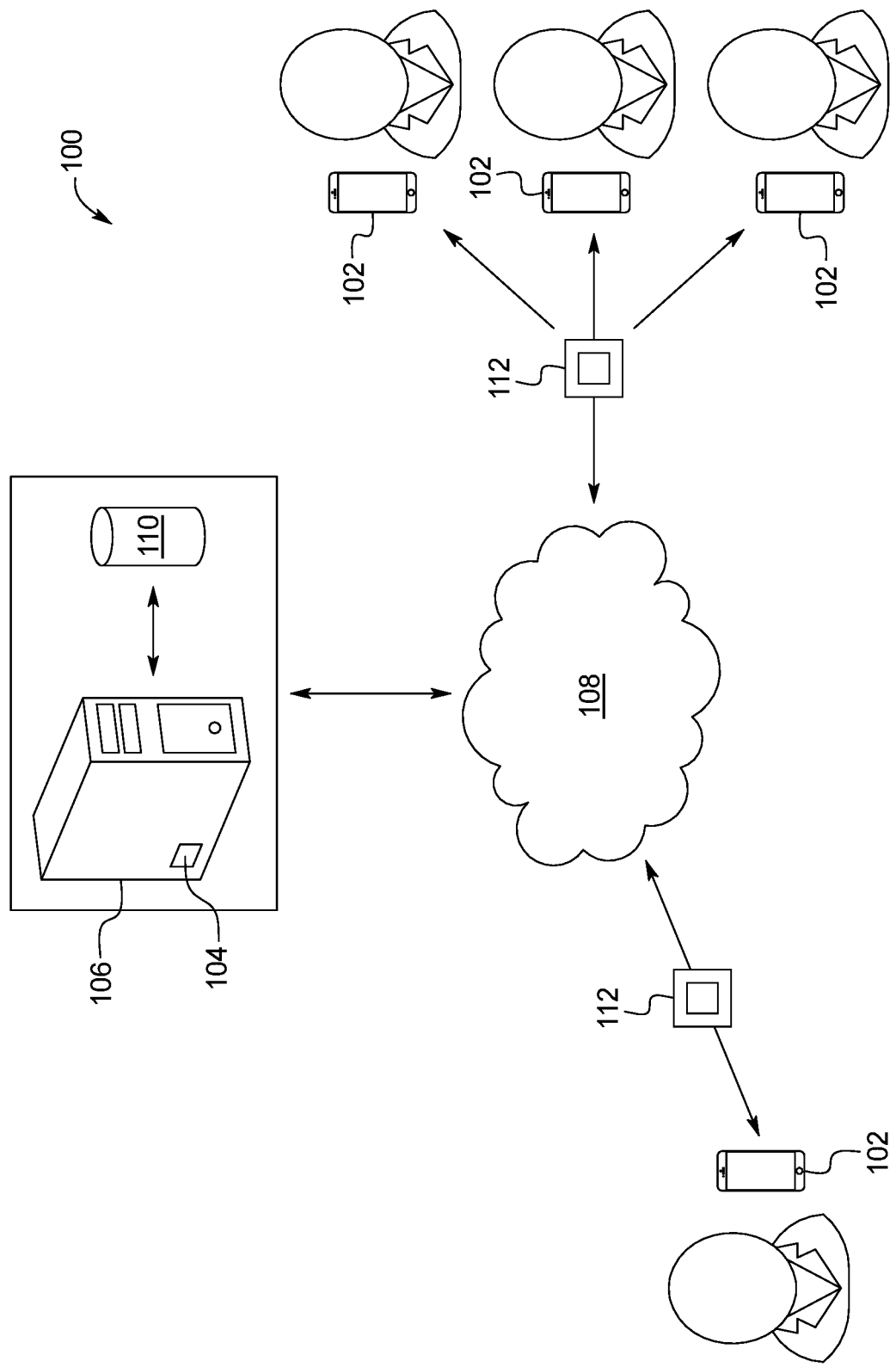
FIG. 1 is a schematic view of the system disclosed herein.
Figure 2A:
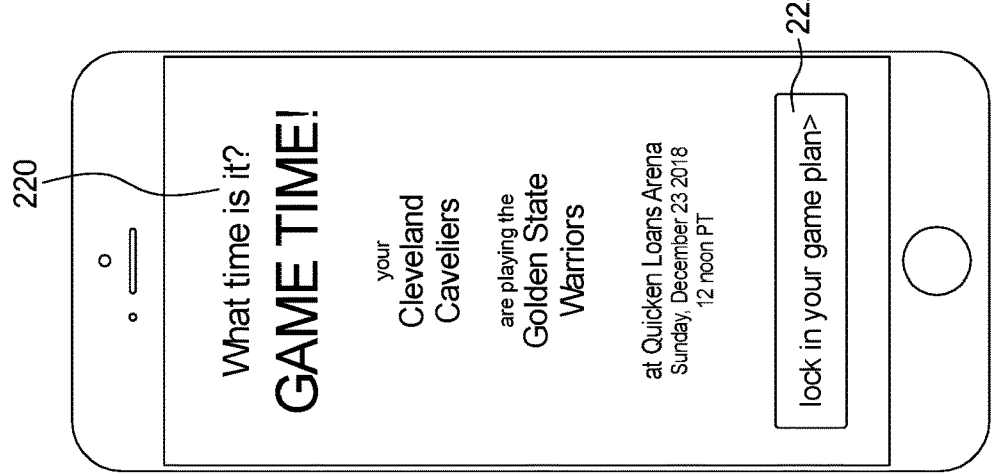
FIGS. 2A, 2B, and 2C include a team selection user interface, a game selection user interface, and a game lock-in user interface of the system of FIG. 1.
Figure 2B:
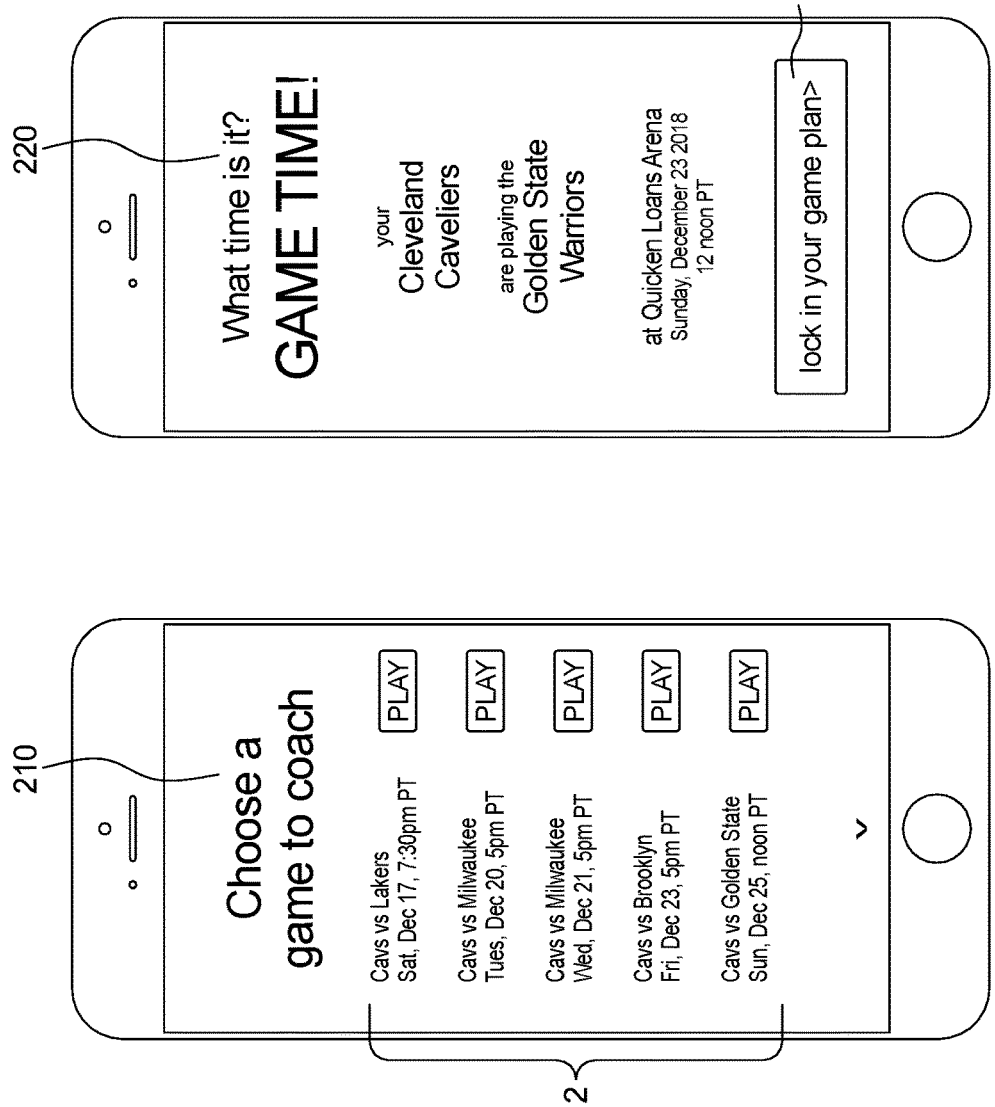
Figure 2C:
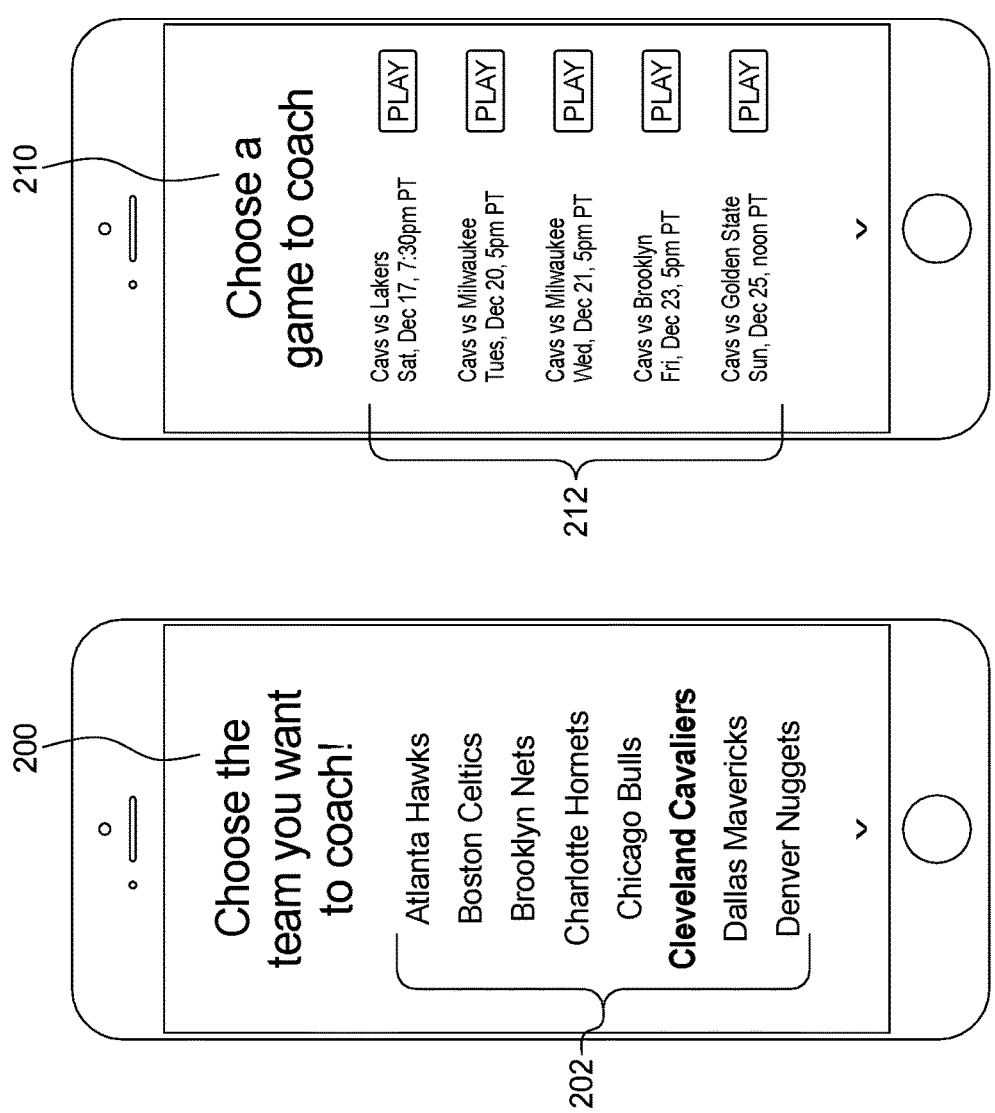

FIG. 1 illustrates an example system 100 for a fantasy sports league based on unique competitive coaching gameplay. Generally, the system 100 enables a user to engage in a fantasy sports game by selecting and applying statistical modifiers, referred to as coaching tactics, to a real life game. Specifically, the system 100 is based on users competing with one another to engineer the widest win margin, or reduce the losing margin, for a selected team through the selection and application of optimized statistical modifiers that produce a corresponding fantasy score outcome of contemporaneous live games by increasing or decreasing points scored for or against the existing teams.

The system 100 includes one or more user devices 102 in communication with a server or controller 106. Wired or wireless communication links over the internet or other cellular network 108 relay data 112 between the devices 102 and the server 106. The server 106 hosts a program that may be accessed through the Internet or on a mobile application running on the devices 102. A database 110 used in connection with the server 106 stores the data 112.

The system also includes a memory 104 coupled to the server 106, wherein the memory 104 is configured to store program instructions executable by the server 106. The user uses the device 102 to connect with the Internet or cellular network 108 to access the program hosted on the server 106. There, the sending user may engage in fantasy game play decisions as described in greater detail below.

While the embodiment in the description below is based on a basketball game, the fantasy sports league system may be applied to a variety of competitive events such as cricket, football, soccer, and hockey, for example. In the example below, the scoring metric is points, which is common to many sports such as basketball, badminton, football, and rugby. The system 100 also applies to sports having other scoring metrics such as, but not limited to, runs (baseball, cricket), goals (soccer, hockey, lacrosse).

The software of the present application enables the user to coach a team by applying statistical modifiers to a live game. In one example embodiment, the system initially generates the game modifier, which is a statistical improvement that, when applied to a team's record, modifies that team's win-loss record to, or near, the best in its professional league's history or potentially beyond. The system then develops optimized statistical modifiers, referred to generally as the coaching tactics that are related to, and intended to improve or nullify, specific player and team statistics and, when applied to the live contest, ideally result in a fantasy score for the user's selected team, that is an improvement over the actual score. The application of the coaching tactics ideally modify the particular statistics of a specific game to improve by an amount near, or beyond, the amount of the game modifier. In the illustrated embodiment, the application of the coaching tactics or statistical modifiers modify scores, statistics, and metrics related to a team statistic. The team statistic may comprise data related to one of a specific player, a specific position, a team play, or a play strategy. For example, the coaching tactic may modify the number of points generated by a specific player (such as Lebron James), generated by a specific position (such as a point guard), generated through a specific game play (such as fast break points or alley-oops), or generated during the execution of a play strategy (such as points scored during fast-paced or slow-paced offense) executed in the live contest.

Where the game modifier is the overall improvement that transforms a team's real-life game results into a highly improved fantasy result, the coaching tactics are the means the system offers to a user to achieve the game modifier for specific real life game statistics of their chosen team. Coaching tactics modify specific statistics within the game, such as points scored by a particular player, or points scored by a team in a particular strategy. The tactics improve the user's chosen team score and reduce the chosen team's opponents score to generate an improved overall game score for the user's chosen team's game or contest, thereby improving the user's chosen team's winning margin (or reducing its losing margin) or turning their chosen team's real game loss into a fantasy win by way of the system's fantasy scoring method.

To calculate the game modifier for a given team, the system 100 analyzes relevant statistical data, calculates the winning or losing margin of each game in the season, and determines a highly successful win-loss record in its professional league's history. The system 100 then deduces the value, that when both added to the team's score and deducted from the opponent's score in each game, would produce a highly improved, successful win-loss record for that team in its given league. In other embodiments, other relevant data and information may be factored into the calculation of the game modifier.

Table 1 below illustrates how the system 100 uses actual and real-time sports data 112 stored within the system's database 110 to calculate a unique game modifier for a user's selected team.

TABLE 1

Application of the Game Modifier
Game Modifier: 4.830 points
Cleveland Cavaliers (CAVS)

| G | Game Date | Opponent | Win or loss | CAVS Actual Score | Opponent Actual Score | Margin | New CAVS Score (game modifier added) | New Opponent Score (game modifier subtracted) | New Fantasy Margin | New Fantasy Result |
|---|---|---|---|---|---|---|---|---|---|---|
| 1 | Oct. 25, 2016 | New York Knicks | W | 117 | 88 | 29 | 121.8 | 83.2 | 38.7 | W |
| 2 | Oct. 28, 2016 | Toronto Raptors | W | 94 | 91 | 3 | 98.8 | 86.2 | 12.7 | W |
| 3 | Oct. 29, 2016 | Orlando Magic | W | 105 | 99 | 6 | 109.8 | 94.2 | 15.7 | W |
| 4 | Nov. 1, 2016 | Houston Rockets | W | 128 | 120 | 8 | 132.8 | 115.2 | 17.7 | W |
| 5 | Nov. 3, 2016 | Boston Celtics | W | 128 | 122 | 6 | 132.8 | 117.2 | 15.7 | W |
| 6 | Nov. 5, 2016 | Phil. 76ers | W | 102 | 101 | 1 | 106.8 | 96.2 | 10.7 | W |
| 7 | Nov. 8, 2016 | Atlanta Hawks | L | 106 | 110 | −4 | 110.8 | 105.2 | 5.7 | W |

The server next generates a number of coaching tactics or statistical adjustments that may be used to improve the selected team's score. The server develops a plurality of statistical adjustments based on the game modifier in view of the relevant statistics for the team and the opponent team's performance, including individual player performance and league history. Each coaching tactic is specific to a player or a team statistic or strategy. Example coaching tactics related to a specific player include boosting/reducing a specific player's score (i.e., James Lebron's score or Kevin Love's score) by a specific percentage or boosting/reducing a specific player's three-point shots attempts. Example coaching tactics related to a team strategy include boosting/reducing team points in the paint, fast break points, or second chance points.

As described herein, the user selects a first coaching tactic that relates to the user's team and a second coaching tactic that relates to the user's team's opponent. Each selection is made from a plurality of options. The user's goal is to select coaching tactics that effectuate the greatest statistical improvement to their team's game or contest. The potency of each tactic is designed to have a reasonable chance to meet, or exceed, the calculated game modifier for their chosen team.

Tables 2 and 3 below provide examples of optional coaching tactics for the NBA's Cleveland Cavaliers that the system 100 may generate and make available to the user for applying to actual game statistics to create extra fantasy points for their team and deduct fantasy points from their opponent's team.

The offensive tactics listed in Table 2 boost the points generated by specific players by a certain percentage. The system 100 takes this percentage increase and applies it to the actual statistic that the player generates within a live game. For example, the system 100 increases Jose Calderon's fantasy points by 40% from the 19 points that Calderon scored in real-time to 26.6 points in the new fantasy statistics. Accordingly, in selecting this coaching tactic at the start of the game, the user adds 7.6 extra points to the Cavaliers' total for this particular game, thereby potentially increasing their win margin or decreasing their loss margin

TABLE 2

Example Offensive Tactics

| Offensive Tactic | Actual game statistics (points) | Fantasy game statistics (points) | Additional points generated by the tactic |
|---|---|---|---|
| Boost Lebron James' points by 20% | 27 | 32.4 | 5.4 |
| Boost Kevin Love's points by 25% | 18 | 22.5 | 4.5 |
| Boost Rodney Hood's points by 30% | 17 | 22.1 | 5.1 |
| Boost Jose Calderon's points by 40% | 19 | 26.6 | 7.6 |
| Boost Jeff Green's points by 35% | 12 | 16.2 | 4.2 |
| Boost Jordan Clarkson's points by 40% | 6 | 8.4 | 2.4 |

Similarly, the defensive tactics listed in Table 3 reduce the points scored by particular players by a certain percentage. The system 100 takes this percentage decrease and applies it to the actual statistic that the player generates within a real life, real-time game. For example, the system 100 decreases Serge Ibaka's points by 35% from the 16 points Ibaka scored in real time to a fantasy score of 10.4 points. Accordingly, in selecting this coaching tactic by the start of the game, the user 102 would reduce the Cavaliers' opponent's score by 5.6 points, thereby increasing the Cavaliers' win margin or decreasing their loss margin.

TABLE 3

Example Defensive Tactics

| Offensive Tactic | Actual game statistics (points) | Fantasy game statistics (points) | Additional points generated by the tactic |
|---|---|---|---|
| Reduce DeMar DeRozan's points by 20% | 19 | 15.2 | −3.8 |
| Reduce Serge Ibaka's points by 35% | 16 | 10.4 | −5.6 |
| Reduce Kyle Lowry's points by 25% | 5 | 3.8 | −1.3 |

TABLE 3-continued

Example Defensive Tactics

| Offensive Tactic | Actual game statistics (points) | Fantasy game statistics (points) | Additional points generated by the tactic |
|---|---|---|---|
| Reduce Jonas Valanciunas' points by 30% | 17 | 11.9 | −5.1 |
| Reduce OG Anunoby's points by 40% | 4 | 2.4 | −1.6 |

As illustrated in Table 4 below, applying the offensive tactic that increases Cleveland's score by 7.6 points and the defensive coaching tactic that decreases Toronto's score by 5.6 points to actual game statistics creates new a fantasy score and winning margin. For example, the user's coaching tactics increased the Cavaliers' actual score of 112 to a fantasy score of 119.6, while decreasing the Toronto Raptors' actual score from 106 to a fantasy score of 100.4, giving the Cavaliers a new fantasy winning margin of 19.2.

TABLE 4

Fantasy Scoring Based on Tactics

|  | Actual game score | Fantasy game score |
|---|---|---|
| Cleveland | 112 | 119.6 |
| Toronto | 106 | 100.4 |
| Cleveland Win or Loss | W | W |
| Game margin | 6 | 19.2 |

Non-limiting examples of tactics used for other sports are provided in Tables 5-7.

TABLE 5

Example tactics for football

| Offensive tactics | Defensive tactics |
|---|---|
| Increase team's points from receiving touchdowns. | Decrease opposing team's points from receiving touchdowns. |
| Increase team's points from rushing touchdowns. | Decrease team's points from rushing touchdowns. |
| Increase team's points from field goals made. | Decrease team's points from field goals made. |
| Increase team's points from extra points made. | Decrease team's points from extra points made. |
| Increase a specific player's points from receiving touchdowns. | Decrease a specific player's points from receiving touchdowns. |
| Increase a specific player's points from rushing touchdowns. | Decrease a specific player's points from rushing touchdowns. |
| Increase a specific player's points from field goals made. | Decrease a specific player's points from field goals made. |
| Increase a specific player's points from extra points made. | Decrease a specific player's points from extra points made. |

TABLE 6

Example tactics for baseball

| Offensive tactics | Defensive tactics |
|---|---|
| Increase team runs by X %. | Decrease team runs by X %. |
| Increase a specific player's runs by Y %. | Decrease a specific player's runs by Y %. |
| Turn certain types of hits into runs. | Nullify certain types of runs. |

TABLE 7

Example tactics for one-day cricket

| Offensive tactics | Defensive tactics |
|---|---|
| Increase team's runs from 6s | Decrease opposing team's runs from 6s |
| Increase team's runs from 4s | Decrease opposing team's runs from 4s |
| Increase team's runs from a particular batting shot type | Decrease opposing team's runs from a particular batting shot type |
| Increase team's runs from extras | Decrease opposing team's runs from extras |
| Increase a particular player's runs | Decrease an opposing player's runs |
| Increase a particular player's runs from 4s | Decrease an opposing player's runs from 4s |
| Increase a particular player's runs from 6s | Decrease an opposing player's runs from 6s |
| Increase a particular player's runs from a particular batting shot type | Decrease an opposing player's runs from a particular batting shot type |

Referring to FIGS. 2A-4B, the system 100 prompts the user to make selections as to which team to coach, which game to play, and which coaching tactics to apply through the series of graphical user interfaces. Upon first accessing the program, the user is presented with a list of teams to coach in a professional sports league 202 through a team selection user interface 200 shown in FIG. 2A. Once the user has selected a team, the program accesses upcoming game schedules for the chosen team, presenting the relevant game list 212 to the user through a game selection user interface 210 shown in FIG. 2B. The user then selects the game that they would like to coach from the game list 212. Once these selections are made, the user may proceed to choose ("lock in") their game plan, i.e. to agree on and confirm their selected game, by selecting a lock button 222 on a game lock-in user interface 220 illustrated in FIG. 2C.

The system presents the user with a plurality of offensive tactics 302 as shown in an offensive tactic selection user interface 300 illustrated in FIG. 3A. The offensive tactics 302 generally boost a specific player's performance by a certain percentage, or a team statistic by a certain percentage, thereby increasing the potential points a given player and/or team might generate within a game. The term "offensive" is intended to describe any tactic that boosts the user's selected team's score, in contrast to a tactic that reduces the opponent's score, referred to as "defensive" tactics. The terms "offensive" and "defensive" are in no way limiting to the types of games and/or strategies that can be applied. Further, the offensive and defensive coaching tactics are tailored to the specific sport. For example, where the game is cricket, the coaching tactics may be fielding and bowling tactics and batting tactics.

Referring to FIG. 3A, the user then selects an offensive tactic to be applied during the game. In some embodiments, the user interface 300 also includes a link for each offensive tactic that leads to a pop-up notification providing additional analytical data concerning the performance of the tactic used for a particular team, or a tactic comparison indicating the average additional points or ranking of a tactic, over the course of a number of games. Selection of an offensive tactic 302 leads the user to the defensive tactic selection user interface 310. The user selects a defensive tactic 312 to employ during the game.

As with the offensive tactics 302 mentioned above, the server presents the user with a variety of defensive tactics 312 through a defensive tactic selection user interface 310 shown in FIG. 3B. These defensive tactics generally reduce a specific player's performance on the opposing team by a certain percentage, or an opposing team statistic by a certain percentage, thereby decreasing the number of points that the player, and/or team, might generate within the game.

Following these selections, the program then presents a visual game plan 322 to the user through a coaching tactic lock-in user interface 320 shown in FIG. 3C, who may select the change tactics button 324 to edit the selection of offensive tactics 302 or defensive tactics 312, or lock-in the selected tactics 302, 312 before the start of the game in real-time by selecting the lock-in button 326.

Once a user locked in their game plan 322, the server monitors the fantasy game in real-time as illustrated in a game score user interface 400 as shown in FIG. 4A. The server collects and analyzes game data in real-time and, in applying the selected offensive and defensive tactics, calculates the fantasy score 402, shown adjacent to the actual, real life game score 404. The game score user interface 400 may also provide a differential 406 to illustrate the impact of the coaching decisions on the fantasy team's score. Selection of a "view your tactics" button 408 on the game score user interface 400 leads the user to a second game score user interface 410, which includes the effects 412, 414 of the offensive and defensive tactics on the fantasy game as well. Further, the second game score user interface 410 may provide real-time performance statistics as the game progresses to monitor how the selected tactics are performing.

FIGS. 5A-6D demonstrate the ability of a user to engage with other users, or other fantasy coaches, in one-to-one or group contests or competitions. Users may select an option 502 to create head-to-head contests, an option 504 to create a group contest, or an option 506 to find an existing contest through a contest selection user interface 500 shown in FIG. 5A.

In creating competitions through a contest generation user interface 510 shown in FIG. 5B, a user may assign a wager amount to the competition by selecting a cash contest generation button 512, or may create a free competition by selecting a free contest generation button 514. Once the contest is created, a user may invite contacts and others to join through buttons 522 on a contest user interface 520 provided in FIG. 5C. A user may join an existing contest prior to the start of the game or during a game. The contest details 532 may also be viewable by other users engaging in the contest through the contest board user interface 530 shown in FIG. 5D. The user who created the contest and those who join the contest will be able to see the entry fee for the contest as well as the size of the contest pool as it grows through the contest details 532.

Figure 5E:
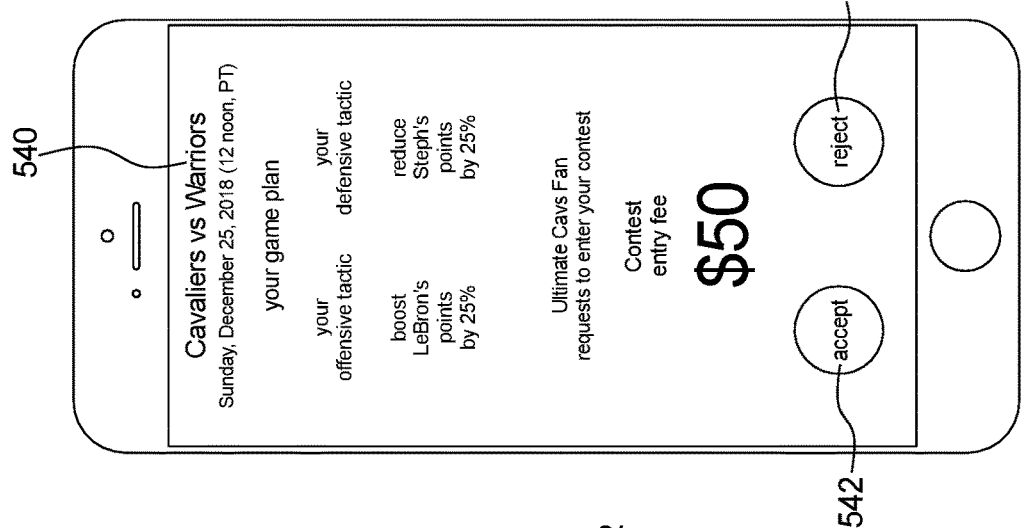
Figure 5D:
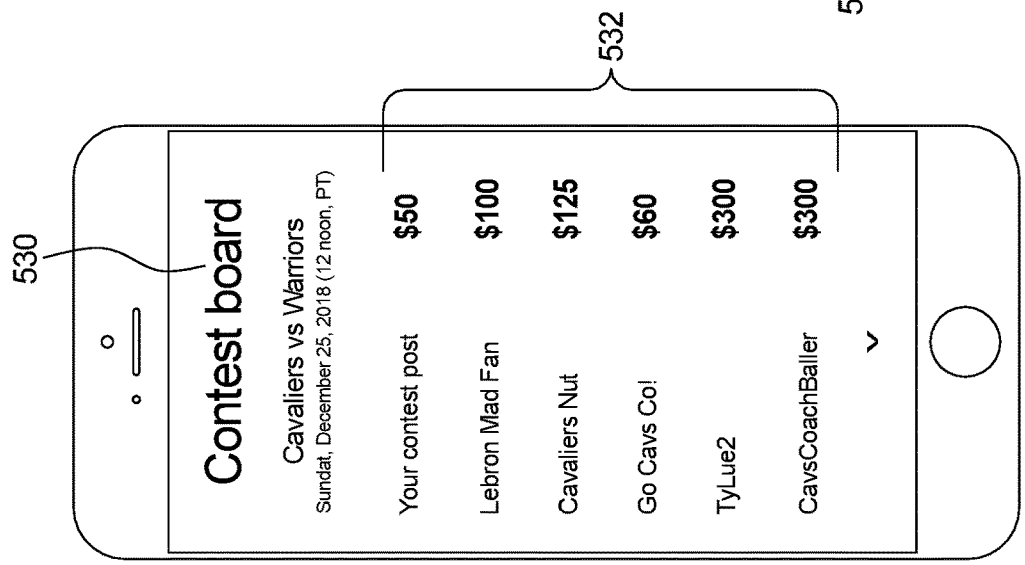

Once a user is invited by another, they receive a notification on their device through a contest offer user interface 540 shown in FIG. 5E. The invited user may see information associated with the contest, including, for example, the date and time of the game and the contest entry fee. In some embodiments, the user may view the offensive and defensive tactics selected by the other user. In other embodiments, the user cannot see which offensive and defensive tactics have been selected by the other user. Referring to the contest offer user interface 540, the invited user may accept or reject this invitation by selecting buttons 542, 544.

Figure 6A:
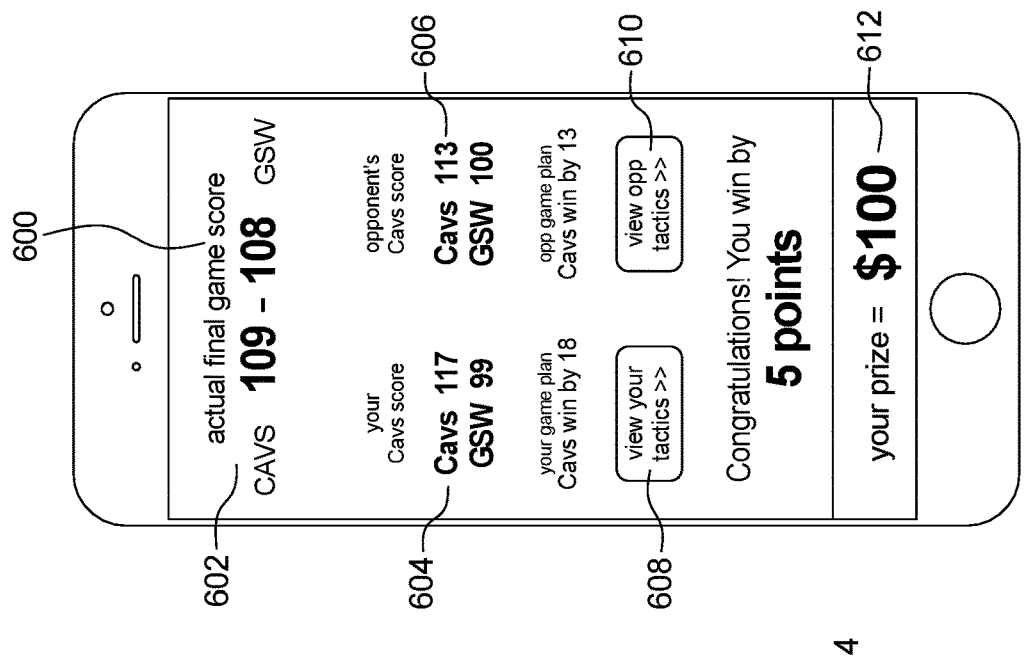
FIG. 6A-6D include a contest score user interface, an overall contest comparison user interface, and contest offensive and defensive tactic comparison user interfaces of the system of FIG. 1.

Referring to FIG. 6A, users can monitor and view the outcome of the fantasy game through a contest score user interface 600, which shows real-time contest statistics on how one user's tactics are affecting the game score in relation to an opponent's tactics. The contest score user interface 600 provides the actual score information 602, your fantasy score information 604, and your opponent's fantasy score information 606. The contest score user interface 600 also includes buttons 608, 610 that lead to views of the user's tactic details and the user's opponent's tactic details. Once the contest or competition has completed, the results of the competition 612 with the prize amount may also be provided on the contest score user interface 600.

Figure 6D:
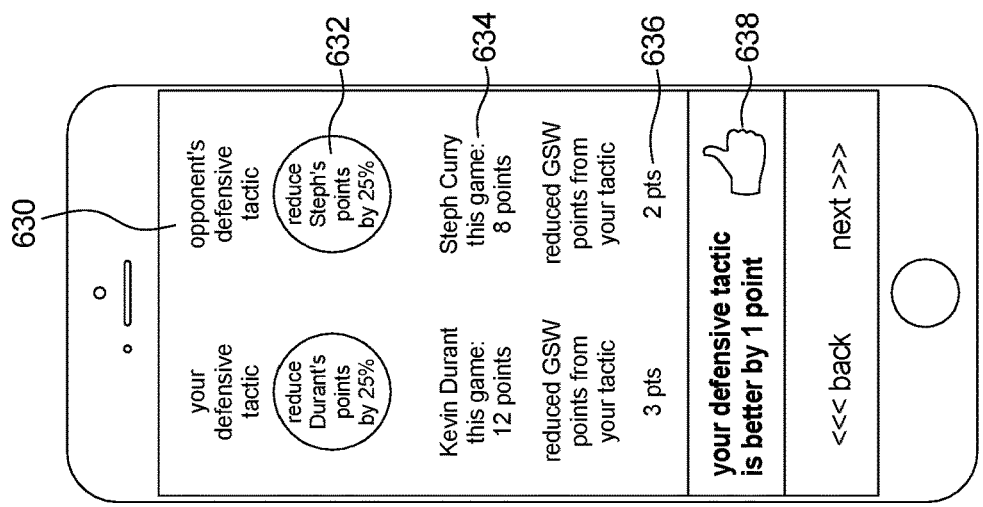
Figure 6C:
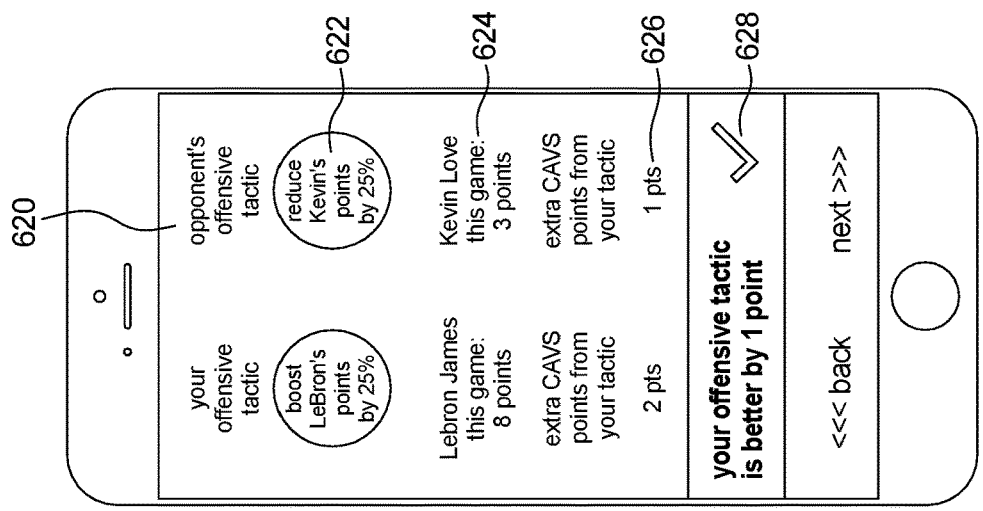
Figure 6B:
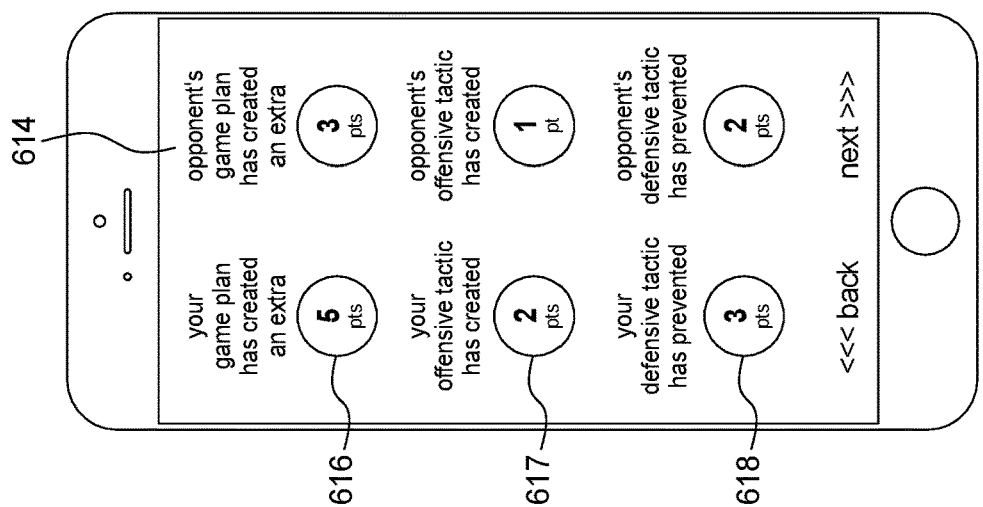

A contest comparison user interface 614 in FIG. 6B shows real-time contest statistics of each user's selected tactics. In the illustrated embodiment, the contest statistics include the improvement effected by each game plan 616, the offensive tactic 617, and the defensive tactic 618 for each user. The contest comparison user interface 614 may include links to contest offensive and defensive tactic comparison user interfaces 620, 630 shown in FIGS. 6C and 6D, which break the statistics comparison down into greater detail. In the examples shown in FIGS. 6C and 6D, the statistics comparison includes the tactic 622, 632, the base statistic 624, 634 to which the tactic is applied, the increase or decrease in the team score 626, 636 due to the tactic, and a comparison 628, 638 of the user's tactics.

The head-to-head or group contests may be coordinated through the system 100 for a single game or competition at a time or throughout a season. Where the competitions continue throughout the seasons, points may be accrued over time, awarded based on user performance, selection of winning coaching tactics, or other various measures. As the user participates in a number of fantasy games throughout a sporting league season(s), virtual points, credits, or tokens may be accrued by the user, having been awarded them based on user performance, success in contests against other users, selection of winning coaching tactics, or other various measures.

In another embodiment, a casino or other gaming entity, referred to in the role of "the house", runs a series of competitions of which users may join in. Multiple players may play against the house at any given time. In some embodiments, the house indicates the offensive and defensive tactics selected for a game prior to the user entering into the contest. In these cases, the user may select the contest to join based on the selected offensive and defensive tactics.

Figure 7:
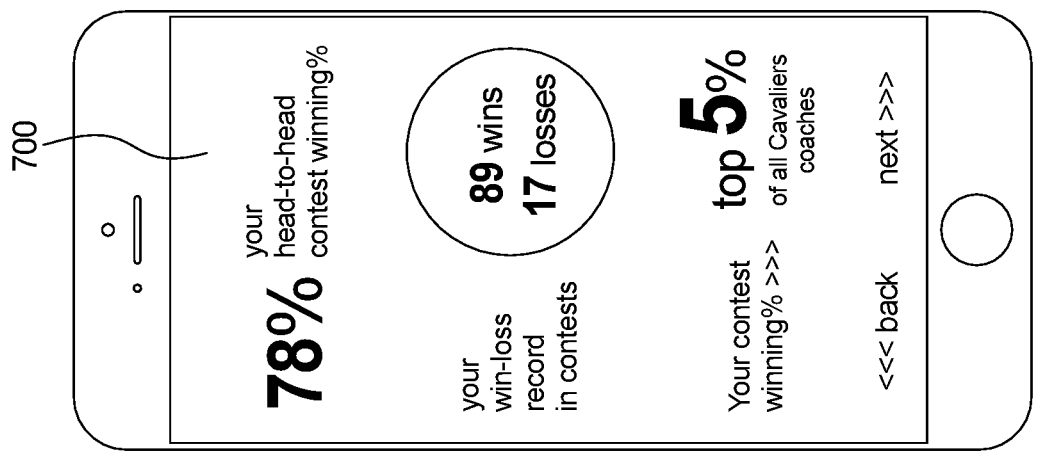
FIG. 7 includes statistic user interfaces of the system of FIG. 1.

During the course of a professional league's season, the server collects and analyzes user statistics concerning users' performance in contests as well as in competitions against other users as described below. User statistics and rankings for various aspects of the contests and competitions, such as a head-to-head contests, may be provided in a user statistic interface 700 in FIG. 7A. The user statistic interface 700 may include statistics related to the user's win-loss records, the user's success rates in contests against other users, and the user's comparison to other users with respect to a specific team.

Figure 8A:
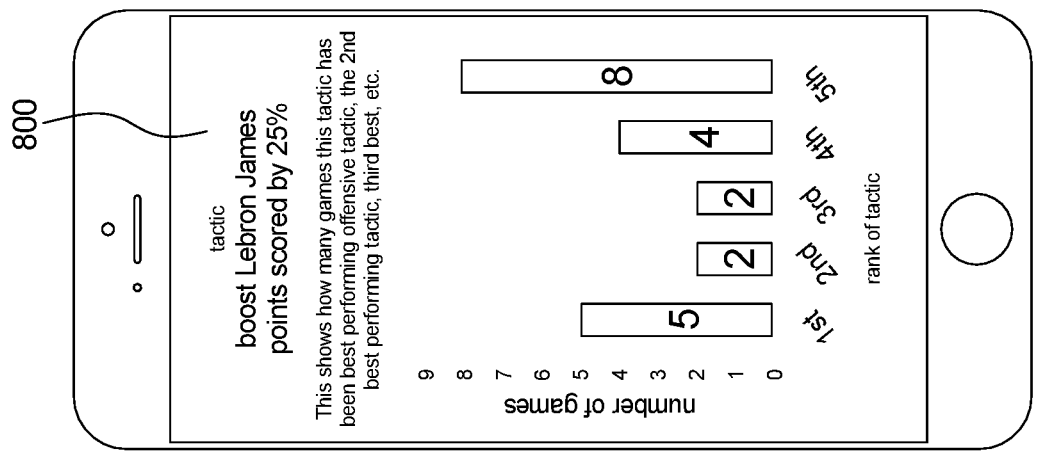
FIGS. 8A-8C include tactic comparison user interfaces of the system of FIG. 1.
Figure 8C:
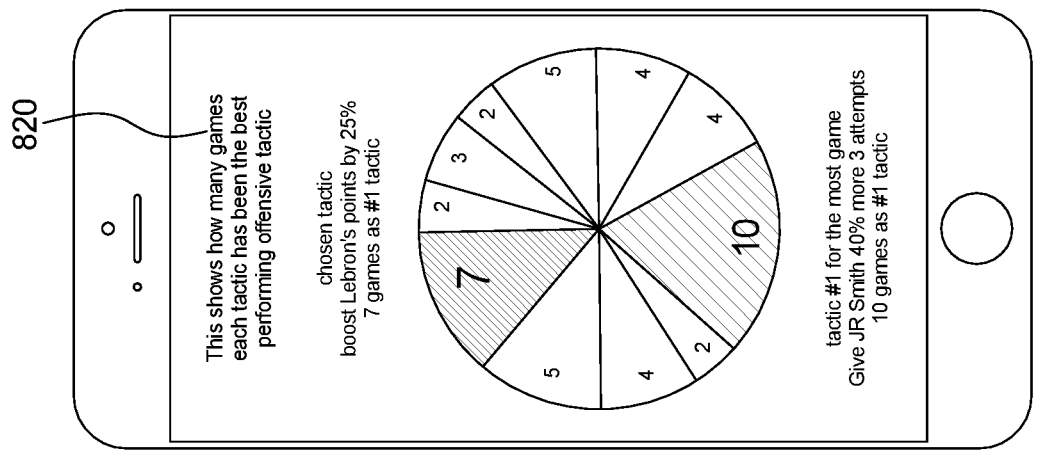
Figure 8B:
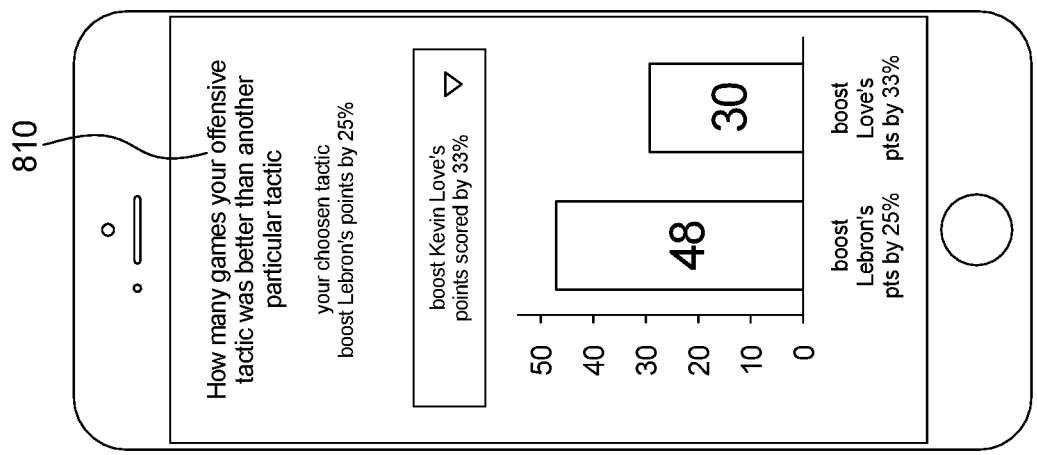

In tactic comparison user interfaces 800, 810, 820 provided in FIGS. 8A-8C, the system 100 provides analytical data concerning the performance of types of offensive and defensive tactics used for a particular team. The tactic comparison user interface of FIG. 8A provides the number of games that a given tactic has been ranked as the first, second, third, fourth, and fifth best performing offensive tactic in a game. In the interface 810 of FIG. 8B, the statistics compare a given tactic against another tactic. In the interface 820 of FIG. 8C, the statistics show how frequently a given tactic has been the best performing tactic.

The server may rank the user in relation to the overall success of their game plan in relation to other users coaching the same game. For example, the server may provide that a user's offensive tactic is ranked $1^{st}$ of 22 offensive tactics for that particular game, their defensive tactic is ranked $2^{nd}$ out of 28 defensive tactics for that particular game, and their game plan is ranked $1^{st}$ out of 572 possible combinations for that particular game. In another example, the user may be ranked in the top two percent of all users playing as a certain team for a certain game, or 506th out of 25,583 coaches for a particular team and game based on other terms.

Throughout game play, the server 106 may send notifications to the user's device via the program stored on the device. These notifications may, for example, inform a user as to how their tactics are performing throughout the course of the game at gameplay intervals (such as periods, quarters, and halves). One example notification is: "At half time, your defensive tactic is the $3^{rd}$ best possible tactic!" In some embodiments, the system may also provide links for the user to publish notifications regarding their performance through social networking platforms. For example, a user may choose to publish their ranking of "best offensive tactic" to Facebook or Instagram.

Throughout a professional league season, the server will store and calculate user data related to their performance history, such as how well or how poorly their coaching decisions have impacted their chosen team's score in relation to other coaches for the same team. The system may provide notifications alerting the user to their rankings. For example, a user may be ranked in the top two percent of all coaches for a particular team, or 1,673rd out of 57,834 coaches for a particular team, over the course of the season.

In addition to sending notifications to a user's device concerning the performance of their tactics during a game, the server and program also facilitate communication between users through a messaging system or board. For example, a user could decide to "trash talk" their opponent during a competition.

Figure 9:
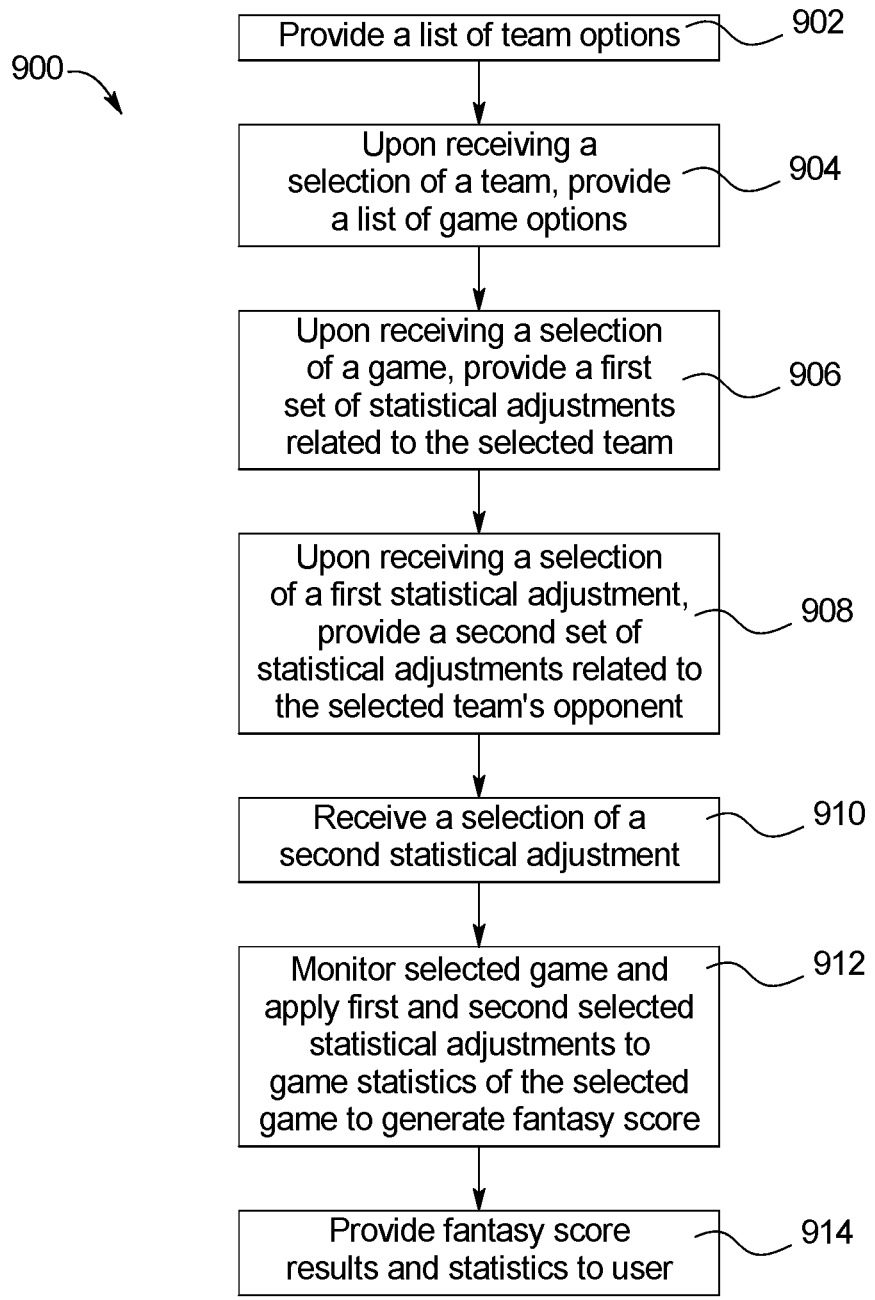
FIG. 9 is a flow chart illustrating the steps to a method of using the system of FIG. 1.

During use, the server is configured to perform the method 900 outlined in FIG. 9. In the first step 902, the system provides a list of team options to the user. Upon selection of a team from the list of options, the system provides a list of game options to the user in step 904. In step 906, a first set of statistical adjustments is provided the user. In one embodiment, the first set of statistical adjustments is related to the team selected in step 902, although it could alternatively be related to the opponent of the selected team. In other embodiments, the first set of statistical adjustments may include combination statistical adjustments that relate to both competing teams. Upon receipt of a selection of a first statistical adjustment in step 906, the system provides a second set of statistical adjustments in step 908. In some embodiments, the second set of statistical adjustments is related to the opposing team against whom the selected team is playing. In other embodiments, the second set of statistical adjustments may be related to the selected team or both competing teams. The system receives the second selected statistical adjustment in step 910. Throughout the actual live game, the system monitors the statistics related to the game and calculates a fantasy score based on the application of the selected statistical adjustments in step 912. In step 914, the system provides the fantasy score results and statistics to the user. Steps 912 and 914 are undertaken repeatedly throughout the actual game in order to provide real-time, up-to-date data to the user.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A fantasy sports system comprising:
a sports data server including real-time scores derived from a plurality of live contests;
a plurality of user devices, each user device being associated with a user;
a database including a plurality of statistical adjustments, wherein each statistical adjustment modifies a score generated during a live contest and is related to a team statistic, wherein each statistical adjustment is a weighting factor that either boosts or reduces the score generated by a player, a position, a play, or a strategy during the live contest;
a controller in communication with the plurality of user devices, the database, and the sports data server, wherein the controller receives data related to a plurality of teams and the plurality of live contests from the sports data server;
a memory coupled to the controller, wherein the memory is configured to store program instructions executable by the controller;
wherein in response to executing the program instructions, the controller is configured to:
provide a live contest selection user interface accessible through each user device through which each user is presented with the plurality of live contests;
receive, from each user device, a selection of one of the plurality of live contests;
receive, from the database, a plurality of first sets of statistical adjustments of the plurality of statistical adjustments, each first set of statistical adjustments being associated with a team statistic related to the selected live contest;
provide a first statistical adjustments graphical user interface accessible through each user device through each user is presented with a first set of statistical adjustments of the plurality of statistical adjustments, the first set of statistical adjustments for each user device being related to the selected live contest;
receive, from each user device, a selection of one of the first set of statistical adjustments from the respective user, wherein the selected statistical adjustment is related to the team statistic of the selected live contest;
receive, from the sports data server, data related to the plurality of live contests including an actual total score and an actual subset score associated with the team statistic for each live contest, wherein the actual total score comprises the actual subset score and a remaining balance score;
modify, for each user device, the actual subset score related to the team statistic by the selected statistical adjustment to generate a modified subset score associated with the team statistic;
not modify, for each user device, the remaining balance score; and
calculate, for each user device, a fantasy score using the modified subset score associated with the team statistic and the unmodified remaining balance score.

2. The fantasy sports system of claim 1, wherein the team statistic comprises data related to one of a specific player, a specific position, a team play, and a team strategy.

3. The fantasy sports system of claim 2, wherein the score that is generated during a live contest and is related to a team statistic is a score generated by a specific player during the live contest.

4. The fantasy sports system of claim 2, wherein the score that is generated during a live contest and is related to a team statistic is a number of fast break points scored during the live contest.

5. The fantasy sports system of claim 2, wherein the score that is generated during a live contest and is related to a team statistic is a number of points scored by one or more alley-oops executed during the live contest.

6. The fantasy sports system of claim 1, wherein the controller is further configured to:
provide, in the game selection graphical user interface accessible, a plurality of teams to each user; and
receive a selection of a selected team from the plurality of teams from each user.

7. The fantasy sports system of claim 1, wherein the fantasy score has a scoring metric selected from the group of points, runs, and goals.

8. The fantasy sports system of claim 1, wherein one of the first set of statistical adjustments boosts the score.

9. The fantasy sports system of claim 8, wherein the one of the first set of statistical adjustments boosts the score by one of a percentage and a number.

10. The fantasy sports system of claim 1, wherein one of the first set of statistical adjustments reduces the score.

11. The fantasy sports system of claim 1, wherein the controller is configured to:
analyze a plurality of win-loss records for a plurality of teams in order to determine the plurality of teams' best win-loss record;
determine a game modifier based on the plurality of teams' best win-loss record; and
derive the plurality of statistical adjustments from the game modifier.

12. The fantasy sports system of claim 11, wherein the game modifier is a value that, when added to the team's score and subtracted from the team's opponent's score for each game in a plurality of games, results in an overall modified win-loss record that is near, equal to, or better than the plurality of teams' best win-loss record.

13. The fantasy sports system of claim 1, wherein the first statistical adjustment is related to a team participating in the live contest, and wherein, in response to executing further program instructions, the controller is configured to:
provide a second statistical adjustments graphical user interface accessible through each user device through which each user is presented with a second set of statistical adjustments related to an opposing team of the team participating in the selected live contest;
receive a selection of one of the second set of statistical adjustments from each user; and
calculate a fantasy score of the opposing team using the data related to the selected live contest and the second selected statistical adjustment, wherein the data includes an actual total score of the live contest, the score related to the team statistic, and the team statistic.

14. The fantasy sports system of claim 13, wherein the first selected statistical adjustment boosts a first score related to the team and the second selected statistical adjustment reduces a second score related to the opposing team.

15. The fantasy sports system of claim 1, wherein the controller is configured to present a further fantasy score of a second user, the second user having selected a further statistical adjustment, the second fantasy score being calculated using data related to the live contest and the further statistical adjustment selected by the second user.

16. The fantasy sports system of claim 1, wherein the fantasy score is related to a single game or competition.

17. A computer-implemented method of scoring in a fantasy sports league comprising the steps of:
providing, through each user device of a plurality of user devices, a list of team options;
receiving, from each user device, a selection of a team;
providing, through each user device, a list of live contest options;
receiving, from each user device, a selection of a live contest;
providing, through each user device, a first set of statistical adjustments related to the selected team, wherein each statistical adjustment modifies a score that is generated during a live contest and is related to a team statistic, wherein each statistical adjustment is a weighting factor that either boosts or reduces the score generated by a player, a position, or a play strategy;
receiving, from each user device, a selection of one of the first set of statistical adjustments and data related to the selected game, wherein the selected statistical adjustment is related to the team statistic;
receiving, from a sports data server, data related to the selected live contest including an actual total score and an actual subset score associated with the team statistic, wherein the actual total score comprises the actual subset score and a remaining balance score;
modifying, for each user device, the actual subset score related to the team statistic by the selected statistical adjustment to generate a modified subset score associated with the team statistic and not modifying the remaining balance score; and
calculating, for each user device, a fantasy score using the modified subset score associated with the team statistic and the remaining balance score.

18. The method of claim 17, wherein the team statistic comprises data related to one of a specific player, a specific position, a team play, and a team strategy.

19. The method of claim 17, further comprising the step of:
providing a second set of statistical adjustments related to an opposing team against whom the selected team is playing, wherein each statistical adjustment modifies a further score generated during the live contest and related to a further team statistic; and
calculating the fantasy score using the data related to the live contest, the first selected statistical adjustment, and the second selected statistical adjustment, wherein the data includes an actual total score of the live contest, the score, the team statistic, the further score, and the further team statistic.

20. The method of claim 17, wherein the selected statistical adjustment is related to one of the selected team and an opponent of the selected team competing in the live contest.

* * * * *